J. R. BUCKWALTER.
TELESCOPING STRAW STACKER.
APPLICATION FILED DEC. 20, 1907.
908,739.
Patented Jan. 5, 1909.
2 SHEETS—SHEET 1.
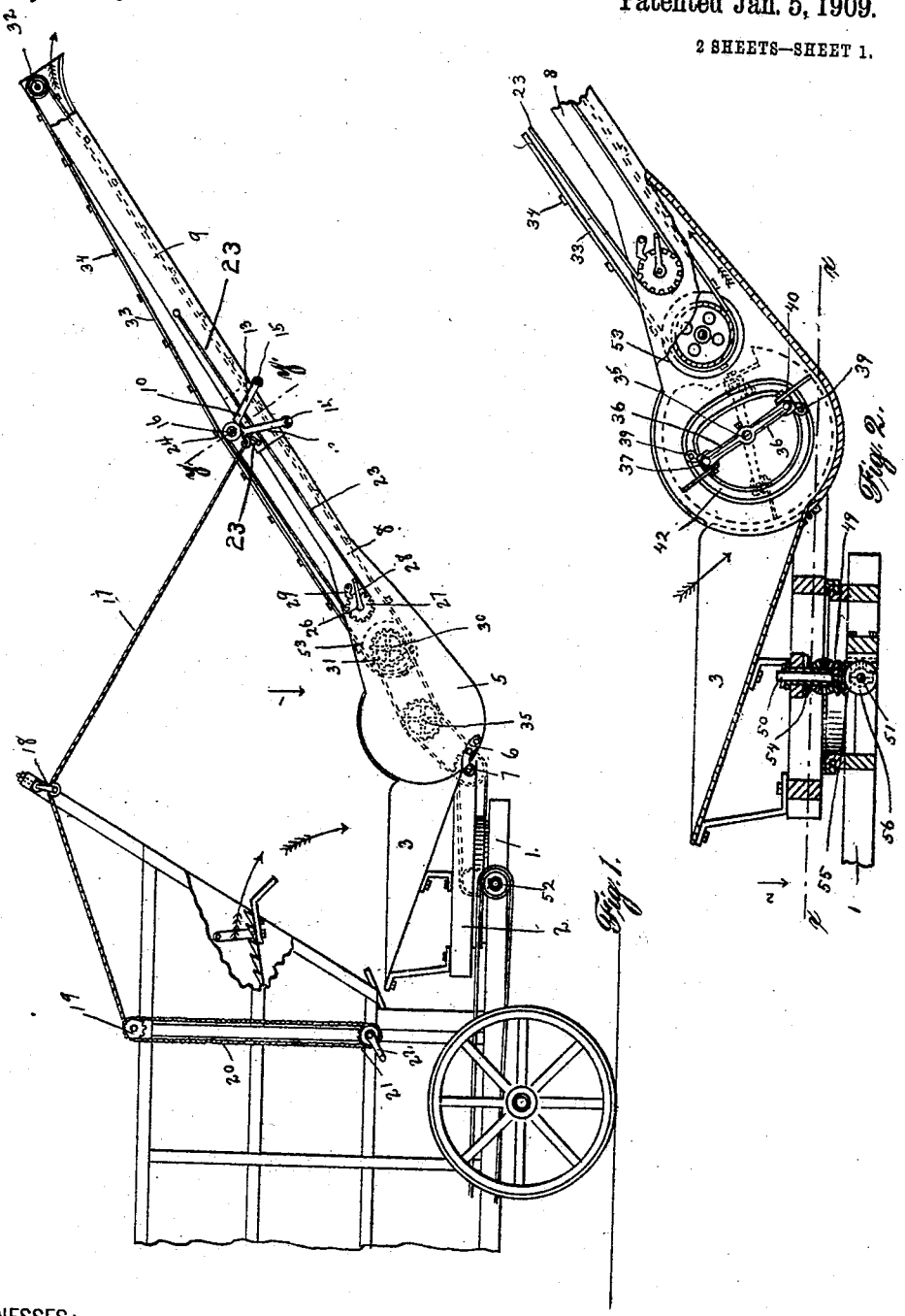
WITNESSES:
Mabel L. Lefevre
Fred P. Mentzer
INVENTOR
John R. Buckwalter.
BY
Herr & Thompson
ATTORNEYS.

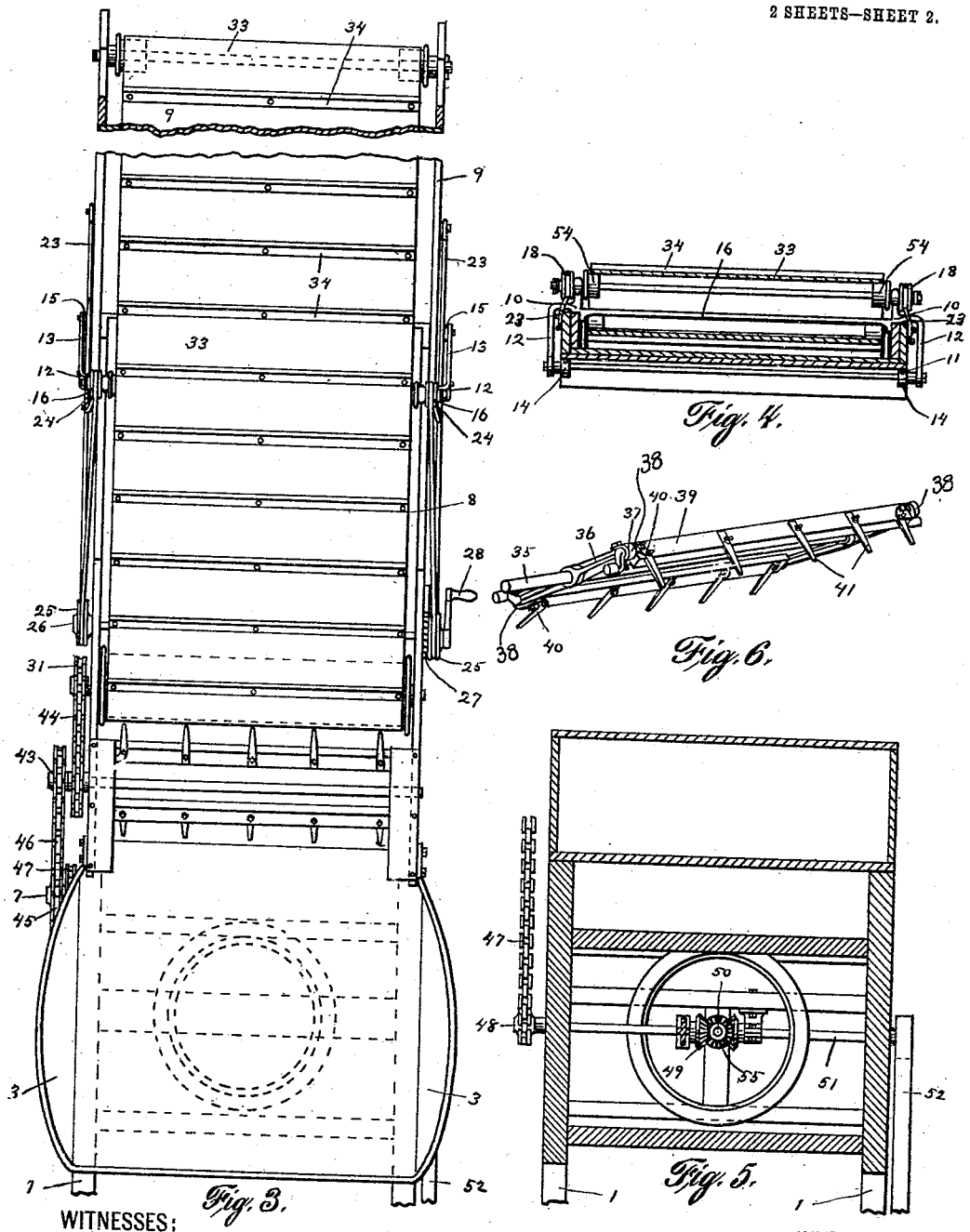

UNITED STATES PATENT OFFICE.

JOHN R. BUCKWALTER, OF KINZERS, PENNSYLVANIA.

TELESCOPING STRAW-STACKER.

No. 908,739.  Specification of Letters Patent.  Patented Jan. 5, 1909.

Application filed December 20, 1907. Serial No. 407,421.

*To all whom it may concern:*

Be it known that I, JOHN R. BUCKWALTER, a citizen of the United States, residing at Kinzers, in the county of Lancaster and State of Pennsylvania, have invented certain new and useful Improvements in Telescoping Straw-Stackers, of which the following is a specification, reference being had therein to the accompanying drawing.

My invention relates to a telescoping straw-stacker adapted to be used in connection with a thresher-machine; one object of the invention being to provide a novel construction of stacker capable of elevating the straw perpendicularly without becoming clogged, carrying the chaff and dirt as well as the straw.

Another object is to provide a telescoping stacker in which the upper section may be made much longer than the lower section, and capable of telescoping down upon said lower section until their upper ends are approximately flush, thus providing a longer stacker when in use and which is capable of compactness for shifting in the barn and for transportation.

Another object is to provide a novel force-feeding device to deliver the straw from the thresher to, and underneath the elevator drag.

I have here illustrated my invention as applied to the usual design of thresher, but it may be applied to any well known make of thresher or stacker, and I do not confine myself to the exact construction as shown, as slight changes may be made in the construction without departing from the spirit of the invention.

In the drawings forming part of this specification: Figure 1, is a view showing the rear end of a thresher in elevation, with my telescoping conveyer raised, and showing the auxiliary feeder. Fig. 2, is an enlarged view of the lower end of the conveyer, showing the feeder and actuating mechanism more in detail. Fig. 3, is a plan view of the conveyer, hopper and auxiliary feeder. Fig. 4, is a sectional view on the line $y\,y$, of Fig. 2. Fig. 5, is a sectional view of the turn table on the line $x\,x$ of Fig. 2. Fig. 6, is a view of the feeder shaft, cross-heads and rakes removed from the conveyer.

Like figures indicate corresponding parts in all the views of the drawings.

In the drawings:—1, indicates the bed-timbers of a threshing machine extended to form supports for the turn-table 2, which is mounted thereon in the usual way, by circular tracks and pivot pin, and to the upper surface of which is rigidly secured the hopper 3, which is made with a downwardly inclined bottom adapted to receive the straw from the thresher, down the inclined surface of which it slides to the auxiliary feeder, which will hereinafter be more fully described. To the forward ends of the bed-timbers 1, are secured in a hingeable manner the lower ends 5, and 5, of the lower section of the conveyer trough by the lugs 6, and 6, and the shaft 7, passed therethrough. The conveyer or stacker is constructed of the sections 8, and 9, the upper section 9, being longer than the lower section 8, and telescoping downward upon the lower section 8, which is hinged to the bed-timber of the thresher as heretofore described. Said sections being in the form of hollow troughs, the upper section sliding upon the lower section and provided with a slightly enlarged and outwardly curved mouth at the top, and the lower section having enlarged lower ends to its sides which are hingeably mounted upon the bed-timber of the thresher and a downwardly and upwardly curved bottom between the inner sides of which is mounted the feeding device.

Near the upper end of the lower trough section are mounted the trusses or brackets 10, which are rigidly secured to the upper edges of the sides of said trough by the bolts 11, and are provided with the off-set arms 12, and 13, to the ends of which are pivoted the guide rollers 14, and 15; the guide roller 15, bearing against the lower edge of the upper trough side, while the arm 12, carrying the guide roller 14, is made slightly longer to allow the lower end of the upper section to drop slightly as it descends to enable it to freely pass the enlarged part of the lower section. The trusses are further secured and braced by the rod 16, extending across the top of the trough and rigidly secured to both trusses, and upon which are mounted idle rollers 54, to support and guide the conveyer belt or drag. To one end of the truss arms 12, is secured the supporting cable 17, which extends over the pulley 18, on the thresher frame and thence secured to the windlass 19, which is operated by the chain 20, the sprocket 21, and the hand-crank 22, the whole adapted for raising and lowering the conveyer as desired.

Secured to the outer surfaces of the sides of the upper section of the trough near its lower end, are the lower ends of the adjusting cables 23, which are passed over the grooved wheels 24, which are rotatably mounted upon the trusses 10, and thence down and over the grooved wheels 25, mounted upon the shaft 26, and keyed thereto, said shaft being journaled in the sides of the lower section 8, and then upward to the outer sides of the upper section 9, where their ends are secured in a positive manner to keep said cables in a stretched position.

Upon the shaft 26, is mounted upon one end thereof, inside of the wheel 25, a ratchet wheel 27, keyed to said shaft, while the end of said shaft is squared and fitted with a hand-crank 28, by which the shaft and wheels may be rotated, which will carry the cables 23, by friction and thus extend or telescope the upper section of the conveyer upon the lower section thereof, where it may be held in any desired position by the pawl 29, engaging the ratchet 27. Mounted within the lower section of the conveyer trough 8, near its lower end is the shaft 30, which carries the drum 53, keyed thereon, one end of said shaft 30, being extended through and beyond the side of said section, and having keyed thereon the sprocket wheel 31. Mounted near the upper end of the upper section 9, is the roller 32, while around said roller 32, and the drum 53, is passed the elevator endless belt or drag 33, upon the outer surface of which are secured the transverse cleats 34, which are so arranged that they come in contact with the surface of the bottom of the troughs. Mounted between the lower ends of the lower section 8, of the conveyer, and journaled in the sides thereof is the shaft 35, to which are rigidly secured the cross-heads 36, of the feeding device; the ends of said cross-heads being provided with bearings 37, and caps 38, and in which bearings are mounted the rake-arms 39, by the cranked shaped extension of the end teeth 40, which are bolted to said rake-arms, and to which are also secured the teeth 41.

To the inner sides of the lower section concentric with the auxiliary feeder shaft 35, are mounted the cam-races 42, in which travel the cranked extensions of the rake-arms 39, in such a manner that the rake-teeth are extended in a radial direction from the center, until they reach the flattened part of the cam-race, where they are drawn in so as to turn the rake-teeth into a right angle position with relation to the axis of said shaft, see dotted lines in Fig. 2, thus allowing them to freely pass by the conveyer-belt and also be cleaned of straw at the same time, by the action of said conveyer-belt passing in an opposite direction from the revolution of said feeder.

To the projecting end of the shaft 35, beyond the conveyer side is keyed the double sprocket wheel 43, which is of larger diameter than the sprocket wheel 31, to which one side of it is belted by the chain 44, and the other side to a sprocket wheel 45, which is keyed to the pivot-shaft 7, and is driven by the chain 46, said sprocket wheel 45, being driven by the chain 47, attached to a sprocket wheel keyed to the shaft 48, mounted in the turn-table frame 2, said shaft 48, terminating at the center of said turn-table in a miter gear 49, rotating on a vertical shaft 50, and meshing with a miter gear keyed to the horizontal shaft 51, which is journaled to the turn-table frame 2, and extends slightly beyond the same, and has secured thereon the pulley 52, which is belted to the thresher.

The turn-table 2, is pivoted upon the bed-timber 1, by the sleeve 54, which is flanged at its top and belted to the under side of said turn table and is secured at its lower end to the miter gear 55, which meshes with the gear 56, mounted on the horizontal shaft 57, secured in bearings in the bed-timber 1, of the thresher, and operated by a hand-crank.

The operation of my device is as follows:— The telescoping members 8, and 9, being lowered from the thresher by the hand-crank 22, and cable 17, to the desired height, the turn-table 2, is swung around by its turning mechanism so as to bring it into the desired position, either directly out from the rear of the thresher or at an angle to the same. The pawl 29, is now raised from engagement with the ratchet wheel 31, and the hand-crank 26, is rotated towards the thresher, which action will rotate the grooved wheel 25, carrying the cable 23, which will extend the upper section of the conveyer until the elevator-belt or drag is extended and brought to the desired tension, when the pawl 29, is allowed to drop into engagement with the ratchet wheel 31, thus securing the telescoped sections in the desired position. The pulley 52, is now rotated by power communicated by the belt 59, giving power to the train of gears and chains, whereby rotating the auxiliary feeder and the endless conveyer-belt, and by the proportion of the gears the elevator-belt will travel at about four times the speed of the feeder. The straw is now delivered by the thresher upon the hopper, down which it slides until caught by the rake-teeth of the feeder by which it is fed to the under side of the endless elevator-belt or drag and thereby dragged up the bottom of the conveyer trough by the cross-slats of said conveyer pressing said straw against the trough bottom and delivering it from the top of said conveyer.

Having thus described my invention, what I claim as new and desire to secure by Letters Patent is:—

1. In a straw-stacker of the class described, a conveyer comprising two sections telescoping one upon the other, a brace-truss secured to the lower member and embracing and guiding said upper member, a cable secured to said truss, a guide pulley and windlass secured to the thresher, and operating said cable, an endless elevator drag mounted within said conveyer, and means for rotating said drag, an auxiliary feeding device rotatably mounted in the lower end of said conveyer, and means for rotating the same, for the purpose set forth.

2. In a straw-stacker of the class described, comprising a telescoping conveyer, a brace-truss secured to the upper part of the lower conveyer section, arms forming part of said truss and carrying guide rollers embracing the upper section of said conveyer, shafts mounted in the sides and near the ends of said sections, rollers secured to said shafts between the sides of said sections, an endless elevating drag traveling upon said rollers, and means for rotating said shafts, for the purpose set forth.

3. In a straw-stacker of the class described, comprising a telescoping conveyer, a brace-truss securing said members, rollers rotatably mounted within said conveyer, an endless conveyer drag traveling upon said rollers, transverse cleats secured to the outer surface of said drag, a feeder shaft mounted near the lower end of the lower conveyer member, and geared to said lower conveyer shaft, sprockets carried by both of said shafts, an endless sprocket chain joining said sprockets, for the purpose set forth.

4. In a straw-stacker of the class described, a shaft journaled near the lower end of the lower conveyer member, cross-heads rigidly secured to said shaft near its ends, toothed rake-arms having crank extensions journaled in bearings in the ends of said cross-heads, and projecting therefrom, cam-races secured to the inner sides of the lower conveyer member, rake-arms journaled in bearings in the ends of said cross-heads, teeth secured to said rake-arms at right angles thereto, end extensions secured to the ends of said rake-arms, and traveling in said cam-races, for the purpose set forth.

In testimony whereof I affix my signature in presence of two witnesses.

JOHN R. BUCKWALTER.

Witnesses:
CHAS. F. BOWMAN,
MABEL L. LEFEVRE.